Dec. 3, 1929.  C. G. GARRARD  1,737,997
MEANS FOR THE TRANSMISSION OF POWER
Filed Aug. 15, 1923    3 Sheets-Sheet 1

INVENTOR
Charles George Garrard
by Darby & Darby
his Attorneys.

Dec. 3, 1929.   C. G. GARRARD   1,737,997
MEANS FOR THE TRANSMISSION OF POWER
Filed Aug. 15, 1923   3 Sheets-Sheet 2

INVENTOR
Charles George Garrard
Darby & Darby
his attorneys

Patented Dec. 3, 1929

1,737,997

UNITED STATES PATENT OFFICE

CHARLES GEORGE GARRARD, OF LONDON, ENGLAND, ASSIGNOR TO GARRARD GEARS LIMITED, OF LONDON, ENGLAND, A COMPANY OF GREAT BRITAIN

MEANS FOR THE TRANSMISSION OF POWER

Application filed August 15, 1923, Serial No. 657,552, and in Great Britain August 28, 1922.

This invention relates to an improved means for the transmission of power from a driving to a driven member, of the type in which the power is transmitted by means of rollers contacting with and rotating between and around inner and outer circular race tracks, and the object of the invention is to effect improvement in power transmission means of this type.

According to my invention, I arrange the rollers and race tracks with curved contact faces, and they are so constructed and arranged that when the binding pressure necessary for power transmission has been applied to the parts by means forming part of the gear, the angles made by the lines representing the normals, at the centers of the contact areas, to the surfaces in contact with a plane at right angles to the main axis of the gear are as small as possible consistent with a contact area sufficient for power transmission, and in no case exceed 10°. In this way the necessary longitudinal pressure is so resolved as to give a relatively high component of radial pressure with a correspondingly small radial movement, due to compression of the contact surfaces.

It will be clear that where curved surfaces are moving, the relative speeds of different points on these surfaces will vary according to the distance of the points from the center of rotation. For this reason it is advisable to arrange the curves to be of relatively large radius, and therefore relatively flat. An advantage of this construction, coupled with the feature of small angularity referred to, is that differences in relative speeds of different parts of the contacting surfaces become negligible. A further advantage of these flat curves is that they enable the contact areas, between rollers and races, which are produced as a result of local flexure and distortion of the surfaces of the metals under pressure to be of sufficient size to enable any desired power to be transmitted without at the same time subjecting the metal to any undue stresses.

A further feature of the invention resides in the fact that the rollers and races may each be divided into one or more pairs of circular parts whereby the pressures which must be applied to the parts are evenly balanced.

My invention further consists in various constructions and arrangements which permit of the application of the features set forth above.

The whole device may be arranged within a housing which may at the same time act as an oil container for the purpose of lubricating the parts. The size of the rollers in proportion to the diameter of the driving shaft will vary according to the gear ratio desired between the driving and driven shafts. The number of rollers employed as well as their shape will depend upon the particular circumstances of the case, such as speed, power to be transmitted, and the like.

Many different modifications in the arrangement and the constructional details of the parts may be made, and some of these will be hereinafter referred to, but several methods of carrying out the invention are illustrated in the accompanying drawings, in which:—

Figure 1:
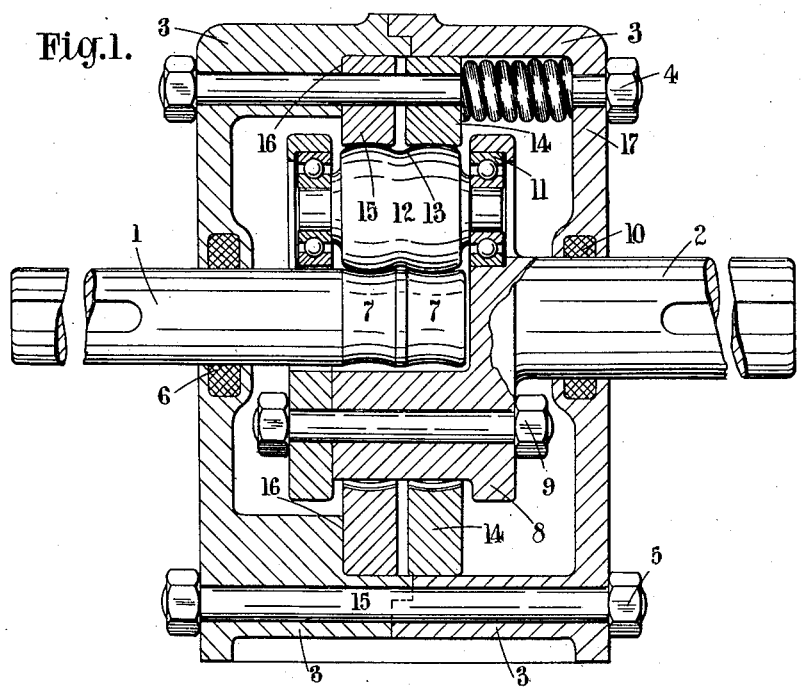
Fig. 1, shows a longitudinal section of the device.
Figure 2:
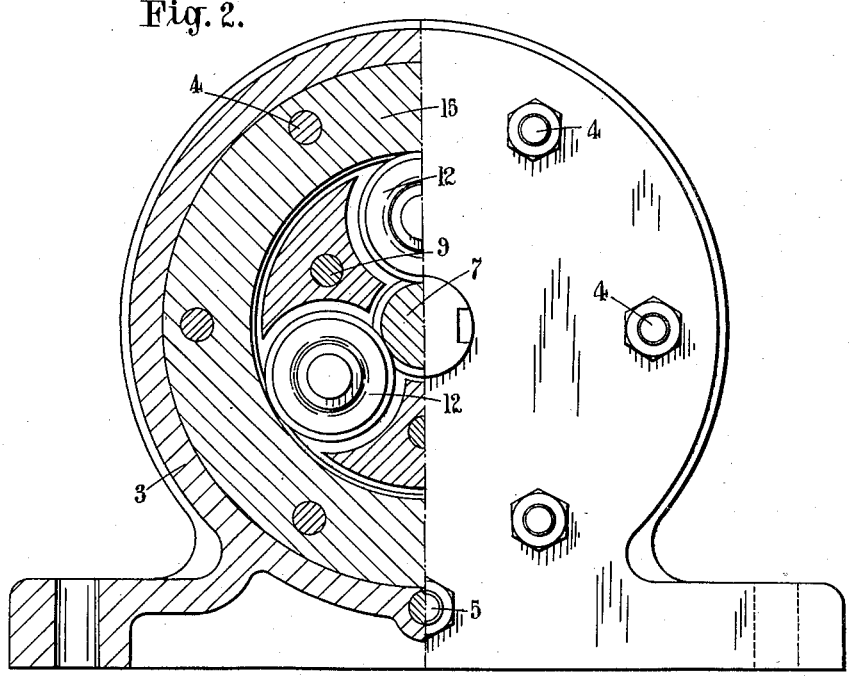
Fig. 2, shows a part sectional front elevation thereof.

In the form illustrated in Figs. 1 and 2 of the drawings, the power of the driving shaft 1 is transmitted with a gear reduction to the driven shaft 2. The device is contained within a circular housing 3, preferably made in two parts, held together by means of a plurality of bolts 4, the additional bolt 5 being provided for assembly purposes. The end of the driving shaft 1, passes into the housing 3, through a stuffing box 6 or the like, and its end is provided with two inwardly curved or concave portions 7, the form shown in the drawings having two of such portions. Surrounding the end of the driving shaft 1, and free to rotate about it, there is disposed a hollow circular cage 8, preferably made in two parts as shown, the parts being bolted together by a plurality of bolts 9. The driven shaft 2, the end of which enters the housing 3 through stuffing box or the like 10, is made integral with or is operatively connected to the cage 8, so that rotation of the latter will cause the shaft 2 to rotate. Mounted in ball bearings 11 within the cage 8, are a plurality of rollers 12, having two spherical or otherwise convexly curved faces 13. The parts are so assembled and arranged that the faces 13, of each of the rollers 12, disposed around the shaft 1, are in permanent contact with the concave portions 7, which latter thus form a race within and around which the rollers rotate. In order to provide the necessary binding pressure for power transmission, rings 14 and 15 are provided, which in the form of my invention illustrated in Figs. 1 and 2, act as fixed races for the rollers, whilst the members 7 may be regarded as moving races. Each of these rings has a concave face engaging the rollers 12, at a point opposite its point of contact with the race 7.

Figure 6:
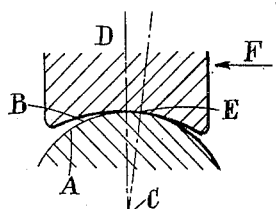
Fig. 6, is a diagram not drawn to scale showing the angularity of the point of contact between the rollers and races.

Both of the said rings are held against rotary movement by means of the bolts 4 passing through them. The ring 15 abuts against the shoulder 16, formed in the housing 3, whilst ring 14 is capable of lateral movement under the influence of the springs 17 coiled around the bolts 4. If now these bolts are drawn up so as to compress the springs 17, the ring 14 will exert a pressure on the rollers 12, which pressure will be taken up by ring 15 and shoulder 16. This pressure will cause a local flexure and distortion of the contact parts of the whole of the rollers and races, whereby surface instead of point contacts are produced. The area of contact will depend not only on the binding pressure but also on the relative radii of curvature of rollers and races, and this ratio is of great importance for the present invention. The radius of curvature of the contact members, i. e. in the drawings, the races must always be greater than that of the convex members, i. e. in the drawings the rollers, and the relation between the radii of curvature of rollers and races and also their widths are so selected that when the binding pressure is applied, the angles formed by the lines representing the normals of the centers of the contact areas, to the contacting surfaces with the plane at right angles to the main axis of the gear are never more and preferably less than 10° whilst in the case of hardened steel to steel, which is what will generally be employed, this angle will be 7° or less. This feature is illustrated in Fig. 6, which for the sake of clearness is not drawn to scale, and in which A represents the curved roller face, and B a curved race face. C is the pont of intersection between the plane D at right angles to the main axis of the gear and the line E representing the normal at the center of the contact area to the surfaces in contact under the influence of pressures applied in the direction indicated by the arrow F. The angle referred to is the angle ECD, and this applies not only to the form illustrated in Figs. 1 and 2, but to all other modifications using curved contact faces.

Generally speaking the radius of the race curvature should be about 1.15 times that of the roller curvature, and this applies generally, both to the construction illustrated in Figs. 1 and 2, as well as to the other modifications using curved faces on the rollers and races.

One advantage of arranging the relative curvatures of about this proportion is that it causes a suitably large area of the surfaces to be in contact when under pressure.

It should of course be noted that the width and curvature of the concave members is such that the desired angularity cannot be exceeded and that the parts are made of such a size as to be able to withstand the stresses and pressures incidental to the speeds and loads required.

The operation of this form of the invention is as follows:—

The necessary pressure is placed on the rollers 12, by means of springs 17, and rings 14 and 15, to prevent slipping. If now the driving shaft 1 is rotated, the rollers 12 will rotate in the opposite direction between the two races, at the same time travelling around the moving race 7, and causing the cage 8 in which they are mounted to rotate in the same direction as the shaft 1, whereby the shaft 2 integral with the cage is likewise caused to rotate. A quantity of lubricating oil is preferably placed in the housing 3, so as to provide splash lubrication for the parts.

Among the many variations in construction which may be made in machines according to the present invention, I desire to refer particularly to the fact that the necessary binding pressure between the rollers and races may be obtained in a variety of ways, and that it is not desired to limit the scope of the invention to the particular methods described herein and illustrated in the drawings, as other ways of obtaining this necessary pressure will doubtless occur to those skilled in the art. Thus for example this pressure instead of being obtained by an adjustment of the fixed races, can equally well be produced by a similar adjustment of the moving race, or by a lateral movement of the rollers, with reference to the races, or if desired by a lateral movement or adjustment of any two or of all three of these parts.

Figure 3:
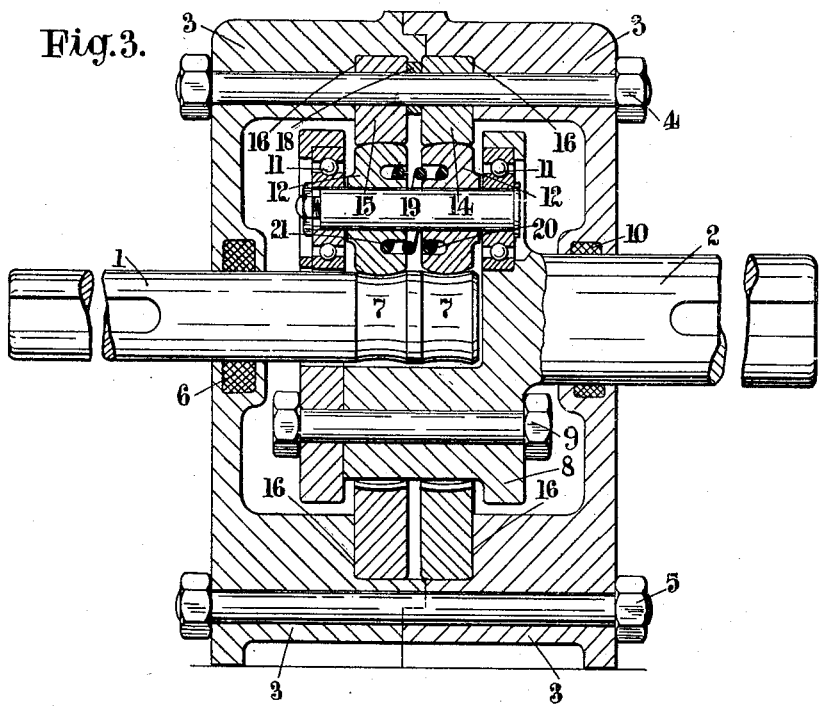
Fig. 3, is a longitudinal section of a modification of the invention, showing a different method of applying the binding pressure to the parts.
Figure 4:
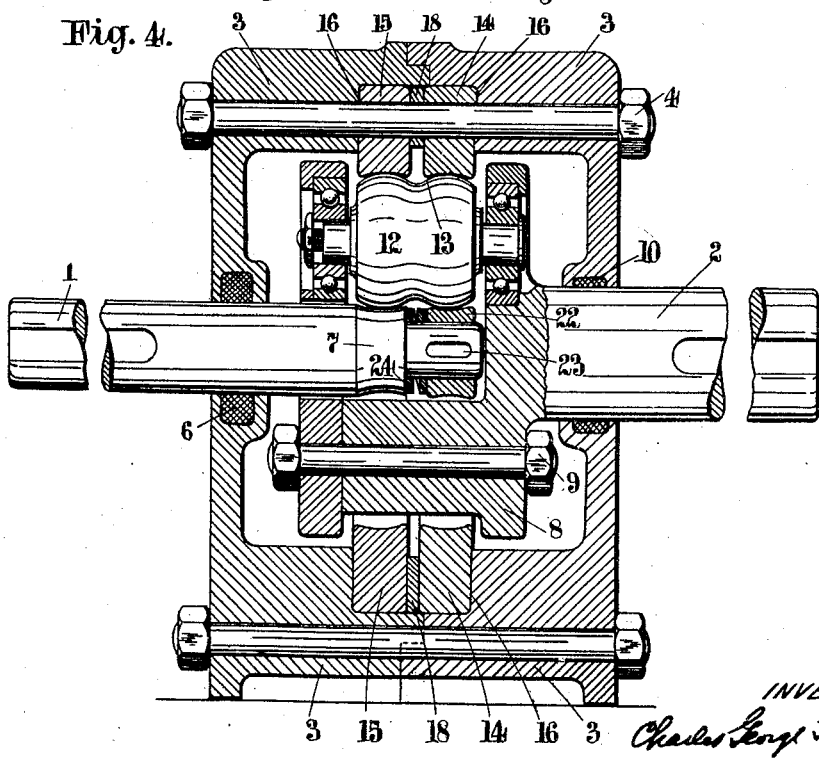
Fig. 4, is a similar view showing yet a further modification of the invention in which the binding pressure is applied in yet another manner.

Figs. 3 and 4, illustrate by way of example two such further methods of obtaining this pressure. In the form illustrated in Fig. 3, the pressure is produced through the rollers 12. In this form the housing 3 is provided with two shoulders 16, instead of the one shoulder illustrated in Fig. 1. The fixed races 14 and 15 are mounted as before on the bolts 4, but in this form they are held apart, and against the shoulders 16, by the distance pieces 18. The rollers 12 are made as separate units and are mounted so as to be laterally movable on the shafts 19, mounted in ball bearings 11. Springs 20 which may be disposed in any convenient manner between the rollers 12, tend to force these rollers apart. One method of disposing the springs is to provide annular co-operating recesses 21, centrally arranged with reference to the shafts 19, in the opposing sides of the rollers 12. The outward pressure on the rollers engaging respectively the moving races 7 and the fixed races 14 and 15, provides the necessary binding pressure between the parts. It will be noted that where the rollers and races have curved faces, the parts are so arranged that the faces cover their respective roller faces on both sides of the centre line, thus enabling the thrust to be taken in either direction.

Yet a further method of obtaining the binding pressure is illustrated also by way of example, in Fig. 4. In this case the necessary pressure is produced by arranging one of the moving races to be laterally movable with reference to the other. The housing 3 has two annular shoulders 16, against each of which one of the two fixed races 14 and 15 is held, by means of the bolts 4 and the distance piece 18. The rollers 12 are each made with two curved faces 13, and are mounted in the cage 8, in a manner similar to that described in connection with Fig. 1. One of the central moving races 7, is, as before, provided on the end of the driving shaft 1, whilst the other moving race 22, is in this modification, made separate from the race 7, and is slidably mounted on the keyed extension 23 of the driving shaft 1. A coil spring 24 is disposed around the extension, and between the races, tends to force the latter apart, and thereby provides the necessary binding pressure. In special cases both the fixed and moving races could be arranged to be laterally movable or adjustable, either by one of the methods described, or in any other convenient manner, and such a construction wound tend to greater flexibility in the drive, particularly as regards alignment.

It will be noted that according to the present invention, a device is provided capable of transmitting power by means of rollers rotating between a fixed and moving race, in which the necessary and relatively large binding pressure is obtained without putting any undue loads on any journal or bearings, either radially or laterally. Indeed it will be seen that in the form illustrated in the drawings, no special bearings are required for the device, as the power transmission means itself, acts as bearings for both the driving and the driven shafts.

Figure 5:
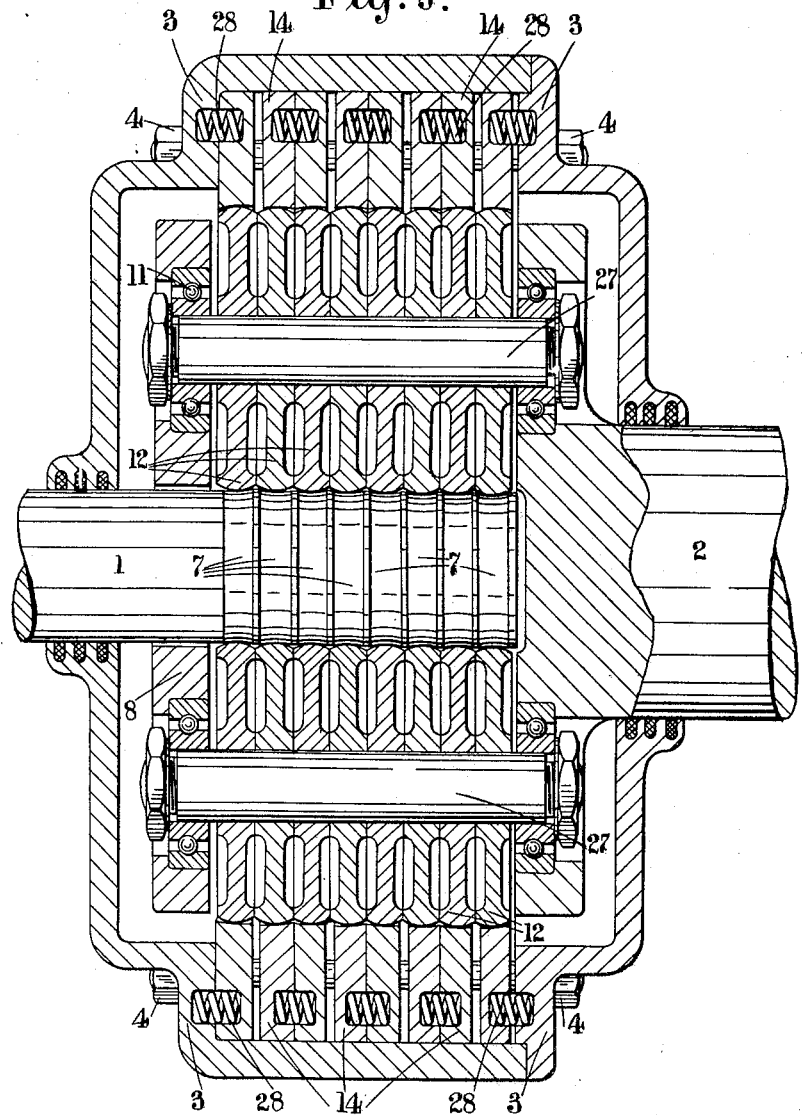
Fig. 5, shows a device according to the invention adapted for obtaining larger and more contact surfaces, this construction being suitable for the transmission of greater powers.

In Fig. 5, I have illustrated one method of applying the invention to the transmission of heavy powers. In this case the driving shaft 1, is provided with eight circular concave races or paths 7, within and around which a plurality of transmission members, each composed of eight separate convex faced rollers 12, mounted on a common shaft 27, are adapted to rotate. The shaft 27 is mounted in ball bearings 11, within the cage 8. A greater or lesser number of roller faces and races could of course be employed if desirable, in any particular circumstances. The outer races are provided with eight rings 14, mounted on bolts 4, and having concavely curved faces. These rings are so spaced that their faces accommodate the faces of the rollers 12.

In a construction of this kind, the binding pressure may advantageously be obtained by the insertion of springs 28, disposed in suitable recesses, and arranged between adjacent pairs of rings 14, or in the case of the outside rings, between the ring and the housing 3.

As regards the number of sets of rollers which are arranged within the cage and around the driving shaft, it should be stated that this will depend on the relative sizes of the shaft and the rollers, which in turn depend on the desired gear ratio, but it will always be preferable to arrange as many sets of rollers in the cage as can be accommodated in the available space.

It may be stated that as the number of rollers is increased, so the tendency to slip which has to be overcome by binding pressure will be reduced.

The invention further is not limited to the use of springs as a means of obtaining the desired binding pressure, as this can also be effected in any other convenient manner.

Several methods of carrying my invention into effect have been described, but it will be obvious that as the invention is capable of very wide application, so also the details of construction and arrangement may be varied through wide limits according to the particular purpose to which it is to be applied.

It will further be obvious that various different effects as to the direction of rotation, speed, and the like may be obtained, either by combining more than one device of the kind described in one assembly, and/or by varying the arrangement as to which of the races is fixed and which rotates.

I claim:—

1. A transmission gear of the type described, comprising rollers and fixed and movable race tracks having curved faces, a rotatable cage, said rollers being mounted in said cage for rotation about their axes, said rollers contacting with both the fixed and movable race tracks, and control means forming part of the gear whereby longitudinal pressure may be applied between the faces of said rollers and said races to make it at least initially operative, said rollers and races being so constructed that on application of the said pressure the angle which the lines representing the normals at the centers of the contact areas to the surfaces in contact make with the plane at right angles to the main axis of the gear do not exceed 10°, said rollers and races being divided into one or more pairs of parts and said control means acting between the parts of one of said pairs.

2. In a transmission gear of the type described, the combination of a driven shaft, provided near its extremity with a pair of race tracks, with curved contacting surfaces, formed on its cylindrical aspect, a driving shaft carrying a cage bearing planet rollers, each provided with a pair of curved contacting surfaces, and an outer casing carrying a pair of race tracks, each consisting of a ring fixed against rotation, and provided with a curved contacting surface, the radii of curvature of all of said race tracks being greater than the radii of curvature of said rollers; and means for effecting binding pressure between said rollers and race tracks, the said rollers, and races being so shaped and arranged that the angle which the lines representing the normals at the centres of the contact areas to the surfaces in contact under pressure make with a plane at right angles to the main axis of the gear do not exceed and are preferably less than 10°.

3. A transmission gear of the type described comprising one or more pairs of non-rotating outer races having curved faces, a similar number of pairs of rotating inner races having curved faces, a rotatable cage within which are mounted a plurality of rollers each of which has one or more pairs of curved faces, said rollers being so mounted within said cage as to be rotatable about their axes and so that each face of said rollers contacts with a fixed outer and a rotatable inner race and control means forming part of the gear whereby lateral pressure may be applied between each roller face and its contacting inner and outer race faces, said rollers and races being so constructed that on application of the said pressure the angle which the lines representing the normals at the centers of the contact areas to the surfaces in contact make with the plane at right angles to the main axis of the gears do not exceed 10°.

4. In a transmission gear the combination with a pair of race track members having curved races, a driving shaft having races thereon, a driven shaft having a cage thereon and a plurality of rollers mounted in said cage for axial rotation, means for effecting relative axial movement of at least one of said races with respect to the other, said rollers contacting with said race track members and with the race tracks on said driving shaft and said rollers and race track members being so constructed that on application of pressure the angle which the lines representing the normals at the centers of the contact areas to the surfaces in contact make with the plane at right angles to the main axis of the gears do not exceed 10°.

5. A transmission gear of the type described comprising one or more pairs of outer races having curved faces, a similar number of pairs of inner races having curved faces, a cage within which are mounted a plurality of rollers each of which has one or more pairs of curved faces, said rollers being so mounted within said cage as to be rotatable about their axes and that each face of said rollers contacts with an outer and an inner race and control means forming part of the gear whereby lateral pressure may be supplied between each roller face and its contacting inner and outer race faces, said rollers and races being so constructed that on application of the said pressure the angle which the lines representing the normals at the centers of the contact areas to the surfaces in contact make with the plane at right angles to the main axis of the gears do not exceed 10°.

In witness whereof I have hereunto set my hand.

CHARLES GEORGE GARRARD.